W. E. MACK.
THERMO-ELECTRIC REGULATOR.
APPLICATION FILED FEB. 12, 1908.
961,145.
Patented June 14, 1910.
2 SHEETS—SHEET 2.
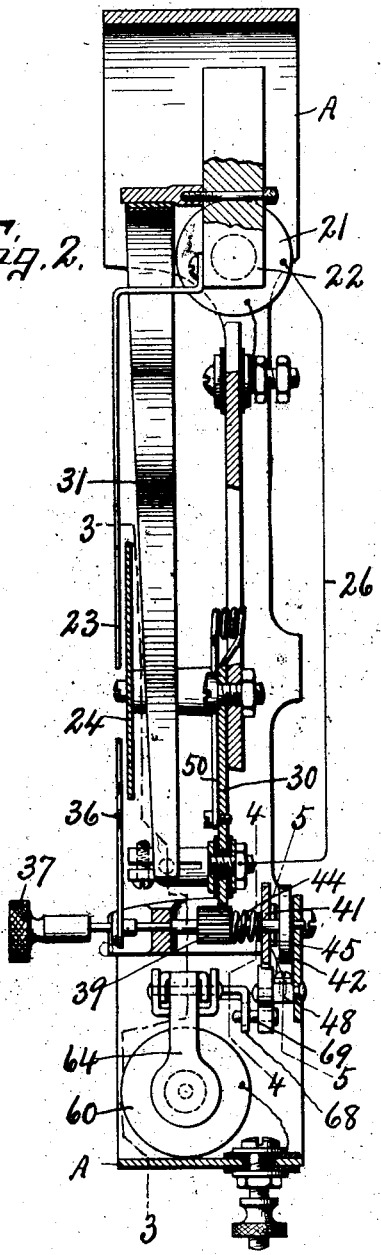
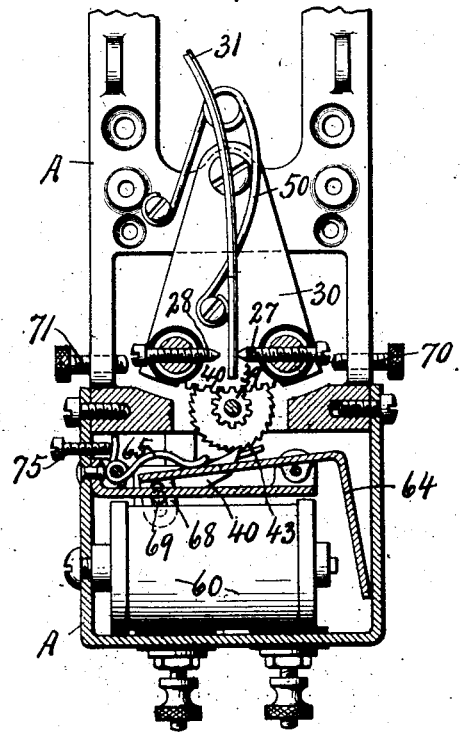
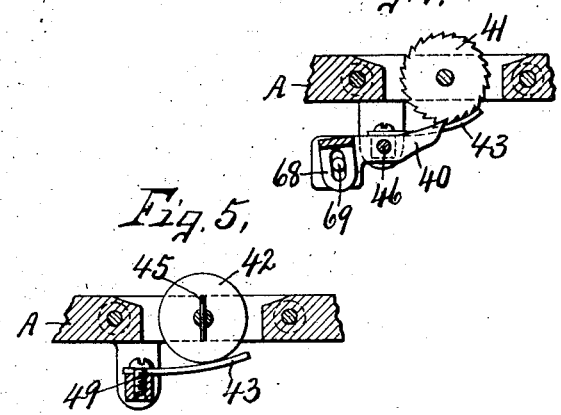
Witnesses.
Inventor.
W. E. Mack
By
Howard P. Denison
Attorney.

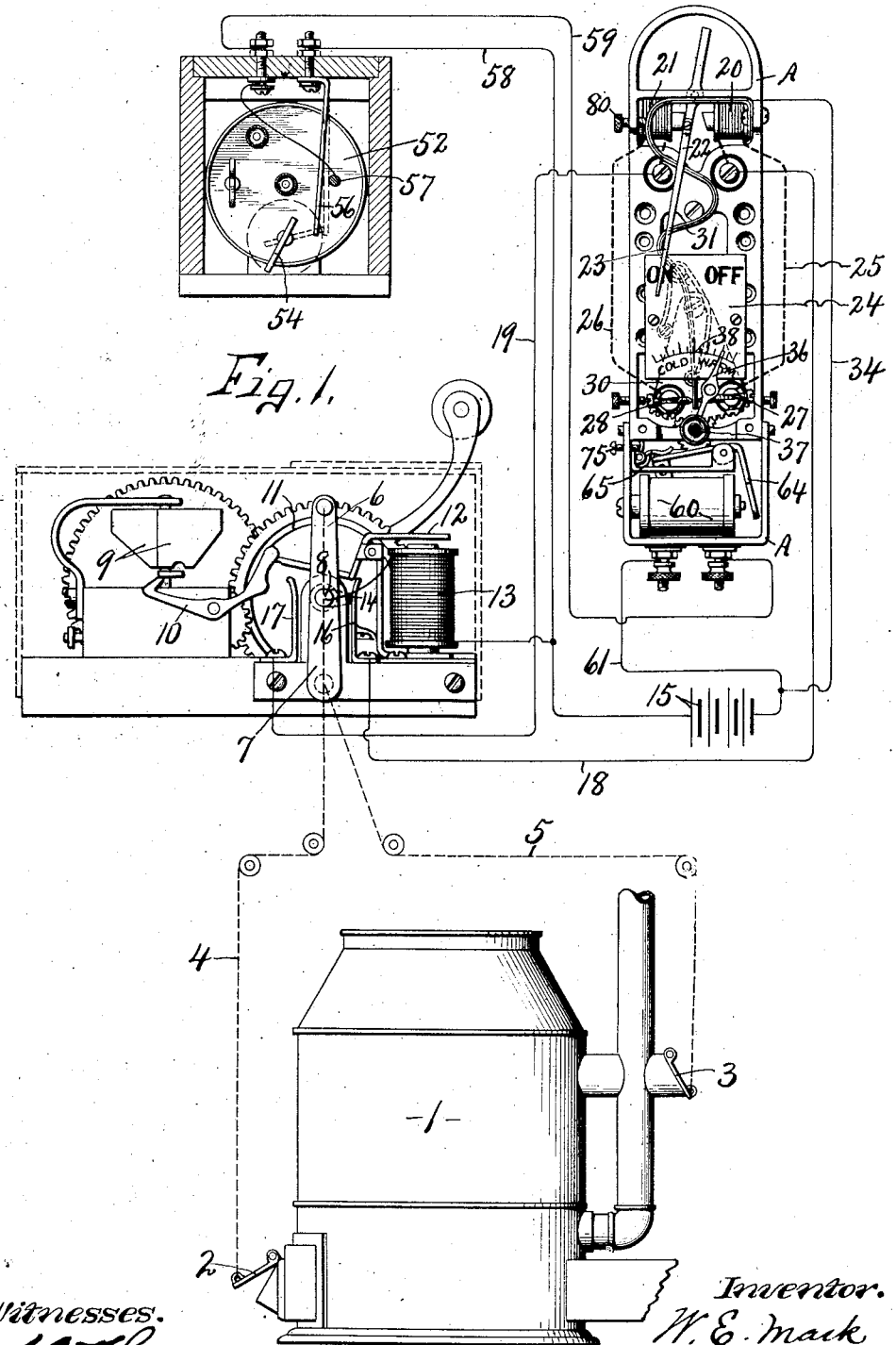

UNITED STATES PATENT OFFICE.

WILLIAM E. MACK, OF FORT PLAIN, NEW YORK.

THERMO-ELECTRIC REGULATOR.

961,145. Specification of Letters Patent. Patented June 14, 1910.

Application filed February 12, 1908. Serial No. 415,627.

*To all whom it may concern:*

Be it known that I, WILLIAM E. MACK, of Fort Plain, in the county of Montgomery, in the State of New York, have invented new and useful Improvements in Thermo-Electric Regulators, of which the following, taken in connection with the accompanying drawings, is a full, clear, and exact description.

This invention relates to certain improvements in thermo electric regulators for valves or dampers of the class set forth in my Patents No. 738,557, dated September 8, 1903 and 680,262, dated August 13, 1901, and refers more particularly to the setting and actuating means for the segment upon which the terminals, which coact with the laminated bar of the thermostat, are mounted and also to the chronometer controlled electrical means for releasing the segment at any predetermined time.

My main object is to enable the thermostat regulator to be set so as to cause the operation of a valve or damper controlling mechanism as for instance the draft or check damper, or both of such dampers, of a heater under a predetermined temperature and at a predetermined time. For example, I have sought to provide means whereby the terminals, which coact with the laminated bar of the thermostat, may be set relatively to said bar so as to electrically control the action of the damper operating mechanism to retain the dampers in a certain position, as for instance the draft damper, closed for a certain period of time or until such time as it may be desired to open the draft, at which time the terminals of the thermostat will be alternately released and thereby close the circuit through the electric damper controlling mechanism, causing the latter to be operated to open the draft damper and at the same time to close the check damper.

Other objects and uses relating to specific parts and combinations of parts of the thermo electric damper controller will be brought out in the following description.

In the drawings Figure 1 is an elevation of a heater having draft and check dampers, a damper controlling mechanism, a thermo electric device for controlling the operation of the damper operating mechanism, and a chronometer such as a clock for controlling the action of the terminal setting mechanism of the thermo electric device, the electrical connections being shown diagrammatically.

Fig. 2 is an enlarged vertical section through the thermo electric regulating device shown in Fig. 1. Fig. 3 is a sectional view taken on line 3—3, Fig. 2. Figs. 4 and 5 are detail sectional views taken respectively on lines 4—4 and 5—5, Fig. 2 showing particularly the means for holding the terminal supporting segment in its adjusted position and also the pawls for releasing the holding means to permit the segment to return to its starting position.

In order to demonstrate the practicability and operation of my invention I have shown a furnace —1— as provided with a draft damper —2— and check damper —3—, said dampers being connected respectively by chains or cables —4— and —5— to diametrically opposite crank arms —6— and —7— which are secured to a shaft —8—, as best seen in Fig. 1, forming a part of the damper operating mechanism which is clearly set forth in my Patent No. 680,262, August 13, 1901. This shaft —8— with the crank arms —6— and —7— is rotated by a suitable spring motor (not shown) through the medium of a train of gears and is adapted to rotate intermittingly one-half revolution at each operation, which operation is controlled by a fan governor and a gravity pawl or detent —10— having one end adapted to engage and hold the governor from rotation and its other end adapted to ride in an annular groove —11— and to automatically drop by its own gravity into one of two diametrically opposite recesses (not shown) but which serve to lock the gearing and motor against further action until the detent is released from locking engagement in said recess. This releasing of the locking pawl —10— is effected through the medium of an armature —12— and electromagnet —13— which latter is in electrical connection with the terminal —14— on the shaft —8— and is also in electrical connection with a suitable source of electrical energy as a battery —15—.

When the damper operating mechanism is locked from movement in the manner just described, the battery —15— is in electrical connection with one of two terminals —16— and —17— located at opposite sides of the shaft —8— in the path of movement of the terminal —14—, said terminals —16— and —17— being connected by separate wires —18— and —19— to electromagnets —20— and —21—, the latter being mounted coaxially in the main supporting frame as —A— of the thermostat with their poles spaced apart to receive between them an oscillatory armature —22— having a pointer —23— which is movable across the face of an indicator plate —24— bearing the words "on" and "off", as best seen in Fig. 1, to indicate the position of the dampers, that is, whether the draft is on or off. These electromagnets —20— and —21— are connected by separate wires —25— and —26— to contact terminals —27— and —28— which in turn are mounted coaxially upon a pivoted oscillatory segment —30— with their meeting points spaced a slight distance apart to receive between them the free end of a composition or laminated thermostatic bar —31—. This laminated bar —31— is secured at its upper end to the main supporting frame —A— and is electrically connected by a wire —34— to one pole of the battery —15— while its lower free end is adapted to alternately contact with the terminals —27— and —28— as the bar is affected by thermal changes thereby closing the circuit through one of the magnets —20— or —21— and electromagnet —13— and thus tripping the pawl —10— from its locking position and permitting the operation of the damper controlling mechanism. For example, assuming that the terminal —14— of the damper operating mechanism is in contact with the terminal —16— and that the motor mechanism is locked and also assuming that in the thermostat the laminated bar —31— is in contact with the terminal —28— and out of contact with the terminal —27— in which position the draft is "on" as indicated by the pointer —23—; now as the temperature rises it causes the free end of the bar to shift position out of contact with the terminal —28— and into contact with the terminal —27— thereby closing the circuit from the battery through the wire —34— and laminated bar —31—, the terminal —27—, wire —25— and electromagnet —20—, thence through the wire —18—, terminals —14— and —16— and electromagnet —13— thence back to the battery —15— thereby energizing the magnets —20— and —13— which causes the armature —22— and pointer —23— to shift position across the face of the indicator plate —24— and into registration with the word "off" and also energizing the magnet —13— to actuate the armature —12— and thereby trip the detent —10— to release the motor. During this action of the motor the crank arms —6— and —7— change positions allowing the draft damper —2— to close and open the check damper —3— at which time weighted pawl or detent —10— drops into the diametrically opposite recess, not shown, and again locks the motor from further action and at the same time causing the terminal —14— to come in contact with the terminal —17— ready to close the circuit through the other electromagnet —21— of the thermostat when the temperature lowers sufficiently to cause the laminated bar to contact with the terminal —28—, it being understood that when the revolving terminal —14— of the damper operating mechanism is in contact with one of the terminals —16— or —17—, the circuit is broken at the thermostat terminals until the temperature is changed sufficiently to cause the action of the laminated bar —31— to close such circuit, which immediately releases the driving mechanism and allows the terminal —14— to shift its position to again break the circuit.

The laminated thermostat bar —31— is preferably corrugated lengthwise for the purpose of increasing its length and thereby increasing its sensitiveness and permitting the parts to be brought within a reasonably compact space.

Journaled on the main supporting frame —A— below the indicator plate —24— is a pointer —36— having a hand piece —37— by which it may be shifted or partially rotated along a suitable concentric scale —38— on the lower end of the indicator plate —24— which is also secured to the main supporting frame, said scale being graduated for different temperatures, and its opposite ends are designated by the words "cold" and "warm", certain graduations indicating degrees of cold while other graduations indicate higher or warmer degrees of temperature.

The shaft upon which the pointer —36— is mounted is provided with a pinion —39— which meshes with a toothed rack —40— on the lower edge of the segment —30— upon which the terminals —27— and —28— are mounted and are, therefore, shiftable laterally relatively to the interposed portion of the laminated bar —31— for the purpose of mechanically controlling the closing of the circuit through one or the other of the electromagnets —20— or —21— and also through the electromagnet —13—. For example, assuming that a warm temperature has been maintained in the house and that upon retiring it is desired to close the draft and that the pointer —36— and terminals —27— and —28— are set through the medium of the rack and pinion to maintain a given warm temperature in the house up to the time for retiring and it is then desired to throw the draft off, it is simply necessary for one of the occupants of the house to shift the pointer —36— through the medium of the hand piece —37— to the cold position along the indicator plate —24— by which operation the contact terminals —27— will be brought into contact with the laminated bar thereby closing the circuit through the electromagnet —20— and also through electromagnet —13— which will cause the operation of the armature —12— to trip the detent and allow the motor to rotate the shaft —8— and crank arms —6— and —7— one-half revolution to close the draft door —2— and open the check —3— at which time the motor mechanism will again be locked against further movement with the contact terminal —14— in contact with the terminal —17— thus breaking the previously closed circuit. This shifting of the segment —30— and its terminals —20— and —28— through the medium of the pointer to the cold position produces a tension upon the free end of the laminated bar causing it to maintain contact with the terminal —27— until such time in the morning as it may be desired to return the segment and its terminals and also the pointer —36— to the warm position. This latter operation of returning the segment —30— and pointer —36— to their normal positions is preferably accomplished automatically through the medium of a chronometer or clock and suitable releasing mechanisms which I will now describe. When the segment —30— and pointer —36— are shifted to the cold position as shown on the indicator plate —24— the segment is held in this position by means of a gravity pawl or detent —40'— and ratchet wheel —41— or by means of a friction disk —42— and —43— either or both of which retarding devices may be employed.

The ratchet wheel —41— is frictionally locked to the shaft of the pinion —39— by means of a coil spring —44— which is tensioned between the adjacent faces of the pinion —34— and ratchet wheel, and presses the latter against a stop pin —45— on the pinion shaft which allows the pinion shaft to be rotated by the hand piece —37— against the holding engagement of the pawl —40'— while the brake shoe —43— acting on the friction disk —42— performs a similar function. The pawl —40'— is pivoted at —46— upon a portion of the main supporting frame —A— and is weighted to automatically force the holding end of the pawl into engagement with the teeth of the ratchet wheel —41—, said pawl being provided with a hub —48— to which one end of the spring brake shoe —48— is secured by means of a fastening screw —49—, Fig. 1, so that when the pawl is thrown out of engagement with the ratchet wheel the brake shoe will also be thrown out of engagement with the disk —42—. This pawl —40'— and brake shoe —43— through the medium of the pinion —39— operate to hold the segment —30— and pointer —36— in their adjusted position with the pointer —36— in registration with the word "cold" on the indicator plate —34— against the action of a suitable retracting spring —50— as best seen in Figs. 2 and 3 although the tension upon the laminated bar —31— performs a similar retracting function under such adjustment. It is now clear that all that it is necessary to do to restore the segment and terminals thereon is to release the pawl —40'— and brake shoe —43— from holding engagement with the ratchet wheel —41— and brake disk —42— respectively. As previously stated I have provided means for effecting this release automatically and at any predetermined time and for this purpose I provide any suitable time piece as a clock —52— with an operating arm —54— similar to the striker of an alarm clock except that it is rigid on a revolving part of the clock and may be set to be released at a predetermined time, the same as the striker of an alarm clock, and when released at such predetermined time it is adapted to engage and operate a spring terminal —56— into contact with an additional terminal —57—, the terminal —56— being electrically connected by a wire —58— to one pole of a source of electric energy as the battery —15— while the other terminal —57— is electrically connected by a wire —59— to an electro-magnet —60— which is mounted in the main supporting frame —A— of the thermostatic regulator as best seen in Figs. 1, 2 and 3, said electromagnet —60— being also electrically connected by a wire —61— to the other pole of the battery —15— so that when the contact terminals —56— and —57— are brought into electrical contact by the operation of the member —54— at a predetermined time, the electromagnet —60— will be energized to operate its armature —64— against the action of a retracting spring —65— as best seen in Figs. 1 and 2. This armature —65— is preferably angular and is pivoted near its angle to a suitable support in the main supporting frame, the horizontal end thereof being provided with a slotted arm —68— which receives a pin —69— on the weighted end of the pawl —40'— so that when the armature —64— is actuated by the energizing of the magnet —60— as previously stated the pawl —40'— and brake shoe —43— are simultaneously thrown from their holding positions thereby permitting the spring —50— to return the segment —30—, terminals —27— and —28— thereon to their normal positions during which action the terminal —28— is brought into contact with the laminated bar —31— thereby closing an electric circuit through the electromagnet —21— and also through the electromagnet —13— causing the release of the damper operating mechanism and consequent opening of the draft damper —2— and closing of the check —3—.

The desired temperature both cold and warm may be more closely regulated by limiting the movement of the segment —30— and its terminals —27— and —28— relatively to the laminated bar —31— and for this purpose I provide adjustable limiting stop —70—, and —71— which are screwed in opposite sides of the main supporting frame in alinement with opposite edges of the segment —30— so as to limit the lateral swinging movement of said segment and thereby regulate the position of the terminals —27— and —28— with reference to the interposed portion of the laminated bar —31—, the adjustment of the limiting stops for the desired temperature being regulated by the position of the pointer —36— with reference to the graduations on the scale —38—. The thermostatic bar —31— may be adjusted relatively to the terminals —27— and —28— by means of an adjusting screw —80— in the main frame —A— and adapted to engage the upper portion of said bar near its fastening so as not to interrupt the free action of the bar throughout practically its entire length under thermal changes and still permit its free end to assume a neutral position between the terminals under a mean temperature.

The tension of the retracting spring —65— may be regulated by a suitable adjusting screw —75— as best seen in Figs. 1 and 3 so that such tension may be gaged according to the strength of the battery which is employed to energize the magnet —60—.

The operation of my invention will be readily understood by reference to the foregoing description and accompanying drawings and it will be seen that the essential features that I have endeavored to bring out are: 1st, the means for mechanically changing the position of the segment and its contact terminals with reference to the interposed laminated bar, 2nd, the means for holding said segment in its adjusted position, and 3rd, the automatic means for releasing the holding means to permit the segments and its terminals to return to their normal position at a predetermined time together with other minor details which will be hereinafter claimed.

What I claim is:

1. In a thermo-electric device for controlling an electrical damper actuating mechanism comprising a supporting frame, a magnet carried thereby and in circuit with a source of electrical energy and in circuit with an electrically-controlled damper actuating mechanism, a magnet carried by the frame and in circuit with a source of electrical energy and in circuit with the electrically-controlled damper actuating mechanism, an oscillatory segment, a contact carried thereby and in circuit with one of said magnets, another contact carried by the segment and in circuit with the other of said magnets, an oscillatory armature extending between said magnets and constituting a pointer, an indicator associating with said armature, a thermostatic bar connected at one end to said frame and extending between said contacts, and when in engagement with one of the contacts closing one of the circuits, a manually-operated means engaging with the segment for adjusting it whereby the contact points are shifted, means engaging with said manually-operated means for maintaining the segment in its adjusted position, an electrical clock controlling means for actuating said holding means to release the segment, means for returning the segment to normal position, a pointer carried by said manually-operated means, and an indicating means associating with said last-mentioned pointer.

2. In a thermo-electric device for controlling an electrical damper actuating mechanism comprising a supporting frame, a magnet carried thereby and in circuit with a source of electrical energy and in circuit with an electrically-controlled damper actuating mechanism, a magnet carried by the frame and in circuit with a source of electrical energy and in circuit with the electrically-controlled damper actuating mechanism, an oscillatory segment, a contact carried thereby and in circuit with one of said magnets, another contact carried by the segment and in circuit with the other of said magnets, an oscillatory armature extending between said magnets and constituting a pointer, an indicator associating with said armature, a corrugated thermostatic bar connected at one end to said frame and extending between said contacts, and when in engagement with one of the contacts closing one of the circuits, a manually-operated means engaging with the segment for adjusting it whereby the contact points are shifted, and means engaging with said manually-operated means for maintaining the segment in its adjusted position, an electrical clock controlling means for actuating said holding means to release the segment, and means for returning the segment to normal position.

3. In a thermo-electric device for controlling an electrical damper actuating mechanism comprising a supporting frame, a magnet carried thereby and in circuit with a source of electrical energy and in circuit with an electrically-controlled damper actuating mechanism, a magnet carried by the frame and in circuit with a source of electrical energy and in circuit with the electrically-controlled damper actuating mechanism, an oscillatory segment, a contact carried thereby and in circuit with one of said magnets, another contact carried by the segment and in circuit with the other of said magnets, an oscillatory armature extending between said magnets and constituting a pointer, an indicator associating with said armature, a corrugated thermostatic bar connected at one end to said frame and extending between said contacts, and when in engagement with one of the contacts closing one of the circuits, a manually-operated means engaging with the segment for adjusting it whereby the contact points are shifted, means engaging with said manually-operated means for maintaining the segment in its adjusted position, an electrical clock controlling means for returning the segment to normal position, a pointer carried by said manually-operated means, and an indicating means associating with said last-mentioned pointer.

In witness whereof I have hereunto set my hand this 5th day of February 1908.

WILLIAM E. MACK.

Witnesses:
A. L. GROS,
CHAS. G. ZIELLEY.